US012180904B2

United States Patent
Tan et al.

(10) Patent No.: US 12,180,904 B2
(45) Date of Patent: Dec. 31, 2024

(54) CONTROL METHOD FOR COMBUSTION SYSTEM, COMBUSTION SYSTEM, AND DIESEL ENGINE

(71) Applicant: WEICHAI POWER CO., LTD., Shandong (CN)

(72) Inventors: Xuguang Tan, Shandong (CN); Peng Zhou, Shandong (CN); Dehui Tong, Shandong (CN); Bin Pang, Shandong (CN); Yuncheng Gu, Shandong (CN); Xiaoxin Liu, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/290,406

(22) PCT Filed: Jan. 21, 2022

(86) PCT No.: PCT/CN2022/073116
§ 371 (c)(1),
(2) Date: Nov. 13, 2023

(87) PCT Pub. No.: WO2022/262276
PCT Pub. Date: Dec. 22, 2022

(65) Prior Publication Data

US 2024/0360798 A1 Oct. 31, 2024

(30) Foreign Application Priority Data

Jun. 17, 2021 (CN) ......................... 202110669915.1

(51) Int. Cl.
*F02D 35/02* (2006.01)
*F02D 41/40* (2006.01)

(52) U.S. Cl.
CPC ......... *F02D 35/023* (2013.01); *F02D 35/028* (2013.01); *F02D 41/40* (2013.01); *F02D 2200/0602* (2013.01)

(58) Field of Classification Search
CPC ...... F02D 35/023; F02D 35/028; F02D 41/40; F02D 41/402–405; F02D 2200/0602;
(Continued)

(56) References Cited

U.S. PATENT DOCUMENTS 6,491,016 B1 * 12/2002 Buratti ................ F02D 41/3827 123/299
8,904,997 B2 * 12/2014 Watanabe ............ F02D 41/405 123/299

(Continued)

FOREIGN PATENT DOCUMENTS

CN 108533410 A 9/2018
CN 108561233 A 9/2018

(Continued)

OTHER PUBLICATIONS

International Search Report for International Application No. PCT/CN2022/073116; Mailing Date, Mar. 30, 2022.

(Continued)

*Primary Examiner* — Logan M Kraft
*Assistant Examiner* — Johnny H Hoang
(74) *Attorney, Agent, or Firm* — CANTOR COLBURN LLP

(57) ABSTRACT

In a control method for the combustion system, spatial intensities of entrainment effects in a cylinder of fuel sprays of the two injections can be superimposed by means of two main fuel injections, two organizations of the fuel sprays for a flow field in the cylinder are implemented; by determining a duration and a first injection pressure of first main fuel injection, a cylinder pressure can at least reach an upper
(Continued)

limit threshold of the cylinder pressure; and during second main fuel injection, in a time period when the cylinder pressure drops from the upper limit threshold of the cylinder pressure to a set cylinder pressure, a change rate of the curve slope of a cylinder pressure change curve at each time point is within a set range of slope change rates, and a rotation angle of a crankshaft is not smaller than a first preset rotation angle.

11 Claims, 3 Drawing Sheets

(58) Field of Classification Search
CPC ........... F02D 2041/389; F02B 23/0672; F02M 61/18; F02M 61/1813; Y02T 10/12
USPC ................ 123/299, 300, 304, 305, 378–481; 701/103–105
See application file for complete search history.

(56) References Cited

U.S. PATENT DOCUMENTS

| | | | | |
|---|---|---|---|---|
| 11,017,132 | B2 * | 5/2021 | Kordon | F02D 41/26 |
| 2005/0205053 | A1 * | 9/2005 | Liu | F02D 41/402 123/299 |
| 2008/0103677 | A1 * | 5/2008 | Music | F02D 41/402 123/478 |
| 2012/0111302 | A1 * | 5/2012 | Shishime | F02D 41/405 123/299 |
| 2014/0216396 | A1 | 8/2014 | Yamashita et al. | |
| 2017/0191442 | A1 * | 7/2017 | Polonowski | F02D 41/401 |
| 2021/0071615 | A1 | 3/2021 | Matsubara et al. | |
| 2021/0277842 | A1 | 9/2021 | Liu et al. | |

FOREIGN PATENT DOCUMENTS

| | | | |
|---|---|---|---|
| CN | 113250843 | A | 8/2021 |
| WO | 2013035272 | A1 | 3/2013 |

OTHER PUBLICATIONS

JPO Notice of Reasons for Refusal for corresponding JP Application No. 2023-566498; Issued Sep. 27, 2024.

* cited by examiner

CONTROL METHOD FOR COMBUSTION SYSTEM, COMBUSTION SYSTEM, AND DIESEL ENGINE

CROSS REFERENCE TO RELATED APPLICATIONS

This is the U.S. national stage of application No. PCT/CN2022/073116, filed on Jan. 21, 2022. Priority under 35 U.S.C. § 119(a) and 35 U.S.C. § 365(b) is claimed from Chinese Application No. 202110669915.1, filed Jun. 17, 2021, the disclosure of which is also incorporated herein by reference.

FIELD

The present application relates to the technical field of diesel engines, and in particular to a method for controlling a combustion system, the combustion system, and a diesel engine.

BACKGROUND

The main combustion method of a diesel engine in the conventional technology is diffusion combustion, and the combustion speed is largely limited by the oil-gas mixing speed. Further, a high-pressure common rail diesel engine generally uses a single main fuel injection. The entrainment effect of single high-pressure injection mainly occurs in the atomization area, the entrainment effect is weakened in the middle of a fuel beam, and the oil-gas mixing effect is poor. Since the diesel engines have high rotation speed, and the time for controlling oil-gas mixing is very short for a four-stroke diesel engine, jets and droplets produced by a single injection are difficult to be timely diffused in the combustion chamber to form a uniform mixture with air after being broken and atomized, thereby limiting a rapid combustion process and further limiting a power output of the diesel engine.

SUMMARY

The object of the present application is to provide a method for controlling a combustion system, the combustion system, and a diesel engine, so as to improve fuel-air mixing uniformity after fuel injection.

In one aspect, a method for controlling a combustion system is provided according to the present application, the combustion system includes a piston, an injector, and a cylinder, the piston is configured to reciprocate up and down in the cylinder, the injector is configured to execute at least a first main fuel injection and a second main fuel injection in sequence during each movement cycle of the piston, and the injector is configured to continuously inject fuel during a process from the first main fuel injection to the second main fuel injection; an injection pressure when a velocity of the fuel injected by the injector is highest during the first main fuel injection executed by the injector is a first injection pressure, and an injection pressure when a velocity of the fuel injected by the injector is highest during the second main fuel injection executed by the injector is a second injection pressure;

the method for controlling a combustion system includes:

determining a duration of the first main fuel injection and the first injection pressure to allow a cylinder pressure to reach a cylinder pressure upper threshold at least at partial moment during the first main fuel injection; and iteratively adjusting at least one of a duration of the second main fuel injection and the second injection pressure, to allow a change rate of curve slopes of a cylinder pressure change curve during a period when the cylinder pressure drops from the cylinder pressure upper threshold to a set cylinder pressure in the second main fuel injection to be within a set range of slope change rates at any time point, and to allow an angle that a crankshaft has rotated to be not less than a first preset rotation angle during the period when the cylinder pressure drops from the cylinder pressure upper threshold to the set cylinder pressure.

As a preferred technical solution of the method for controlling a combustion system, that determining the duration of the first main fuel injection and the first injection pressure to allow the cylinder pressure to reach the cylinder pressure upper threshold at least at partial moment during the first main fuel injection includes:

iteratively adjusting at least one of, a start time and an end time of the first main fuel injection, and current first injection pressure, until the cylinder pressure reaches the cylinder pressure upper threshold at least at partial moment during the first main fuel injection, a crankshaft angle when the cylinder pressure reaches the cylinder pressure upper threshold for a first time does not exceed a first angle, and an angle that the crankshaft has rotated during a period when the cylinder pressure rises from the first cylinder pressure to the cylinder pressure upper threshold is not less than a second preset rotation angle, in a case that the cylinder pressure never reaches the cylinder pressure upper threshold during the first main fuel injection; specifically, a corresponding cylinder volume when the cylinder pressure is equal to the first cylinder pressure is the same as a corresponding cylinder volume when the cylinder pressure reaches the cylinder pressure upper threshold for the first time.

As a preferred technical solution of the method for controlling a combustion system, during each movement cycle of the piston, a timing when the injector starts the first main fuel injection is a first time $t_1$, a timing when a velocity of the fuel injected by the injector is lowest between the first main fuel injection and the second main fuel injection is a second time $t_2$, and the first injection pressure is $P_1$;

that, iteratively adjusting at least one of the start time and the end time of the first main fuel injection, and the current first injection pressure until the cylinder pressure reaches the cylinder pressure upper threshold at least at partial moment during the first main fuel injection, the crankshaft angle when the cylinder pressure reaches the cylinder pressure upper threshold for the first time does not exceed the first angle, and the angle that the crankshaft has rotated during the period when the cylinder pressure rises from the first cylinder pressure to the cylinder pressure upper threshold is not less than the second preset rotation angle, in the case that the cylinder pressure never reaches the cylinder pressure upper threshold during the first main fuel injection, includes:

collecting the cylinder pressure P in the cylinder in real time, collecting the crankshaft angle in real time, comparing the cylinder pressure P with the cylinder pressure upper threshold $P_{max}$, and determining whether the crankshaft angle exceeds the first angle, during the first main fuel injection; and increasing the first injection pressure $P_1$, and/or, wholly reducing a difference between the second time $t_2$ and the first time $t_1$, if the cylinder pressure P is less than the cylinder pressure upper threshold $P_{max}$, and the crankshaft angle is behind the first angle.

As a preferred technical solution of the method for controlling a combustion system, the increasing the first injection pressure $P_1$, and/or, wholly reducing the difference between the second time $t_2$ and the first time $t_1$ includes:

acquiring a maximum value $P_x$ of the cylinder pressure during the first main fuel injection;

calculating $n=(P_{max}-P_x)/P_{max}$; and only increasing the first injection pressure $P_1$ by a first set value if $n\leq 5\%$.

As a preferred technical solution of the method for controlling a combustion system, the method further includes increasing the first injection pressure $P_1$ by the first set value and adjusting the first time $t_1$ and/or the second time $t_2$ to wholly reduce the difference between the second time $t_2$ and the first time $t_1$ by a second set value if $n>5\%$.

As a preferred technical scheme of the method for controlling a combustion system, if the cylinder pressure P is not less than the cylinder pressure upper threshold $P_{max}$, and the crankshaft angle is before the first angle, the method further includes:

acquiring a real-time cylinder volume V in the cylinder when the cylinder pressure P is equal to the cylinder pressure upper threshold $P_{max}$;

acquiring a corresponding crankshaft angle $\phi_a$ when the cylinder goes up and a crankshaft angle $\phi_b$ when the cylinder goes down when the cylinder volume is equal to the real-time cylinder volume V, according to a relationship map between the cylinder volume and the crankshaft angle;

calculating $\phi_1=\phi_b-\phi_a$;

comparing $\phi_1$ with the second preset rotation angle $\phi_n$; and increasing the first injection pressure $P_1$ by a third set value, and/or adjusting the first time $t_1$ and/or the second time $t_2$ to reduce the difference between the second time $t_2$ and the first time $t_1$ by a fourth set value as a whole, in a case that $\phi_1<\phi_n$.

As a preferred technical solution of the method for controlling a combustion system, the second injection pressure is $P_2$, that iteratively adjusting at least one of the duration of the second main fuel injection and the second injection pressure, to allow the change rate of the curve slopes of the cylinder pressure change curve to be within the set range of slope change rates at any time point during the period when the cylinder pressure drops from the cylinder pressure upper threshold to the set cylinder pressure in the second main fuel injection, and to allow the angle that the crankshaft has rotated during the period when the cylinder pressure drops from the cylinder pressure upper threshold to the set cylinder pressure to be not less than the first preset rotation angle, includes:

in a case that $\phi_1\geq\phi_n$;

acquiring a crankshaft angle $\phi_c$ when the cylinder pressure P is equal to $P_n$ according to the map, specifically, $\phi_c>\phi_b$, $P_n$ is the set cylinder pressure and $P_{max}>P_n$;

acquiring a relationship curve y between the cylinder pressure and the crankshaft angle in a range from the crankshaft angle $\phi_b$ to the crankshaft angle $\phi_c$;

calculating $k_1=dy/d\phi$, and $k_2=dk_1/d\phi$, specifically, a range of $\phi$ is from $\phi_b$ to $\phi_d$;

acquiring a maximum value $k_{max}$ of absolute values of $k_2$;

comparing $k_{max}$ with a preset parameter $k_a$; and increasing the second injection pressure $P_2$ by a fifth set value if $k_{max}<k_a$.

As a preferred technical solution of the method for controlling a combustion system, a timing when the injector ends the second main fuel injection is a third time $t_3$, if $k_{max}\geq k_a$, the method for controlling a combustion system further includes:

calculating $\phi_2=\phi_c-\phi_b$;

comparing $\phi_2$ with the first preset rotation angle $\phi_m$; and increasing the third time $t_3$ by a sixth set value in a case that $\phi_2<\phi_m$.

As a preferred technical solution of the method for controlling a combustion system, the method for controlling a combustion system further includes maintaining the third time $t_3$ constant in a case that $\phi_2\geq\phi_m$.

In another aspect, a combustion system is provided according to the present application for implementing the method for controlling a combustion system described above. The combustion system includes a piston, an injector, a cylinder and a controller, the controller is configured to control the injector to execute at least the first main fuel injection and the second main fuel injection in sequence during each movement cycle of the piston, and the injector is configured to continuously inject fuel during the process from the first main fuel injection to the second main fuel injection;

the controller is configured to determine the duration of the first main fuel injection and the first injection pressure to allow the cylinder pressure to reach the cylinder pressure upper threshold at least at partial moment during the first main fuel injection; and the controller is configured to iteratively adjust at least one of the duration of the second main fuel injection and the second injection pressure, to allow the change rate of the curve slopes of the cylinder pressure change curve to be within the set range of slope change rates at any time point during the period when the cylinder pressure drops from the cylinder pressure upper threshold to the set cylinder pressure, and to allow the corresponding angle that the crankshaft has rotated to be not less than the first preset rotation angle during the period when the cylinder pressure drops from the cylinder pressure upper threshold to the set cylinder pressure, in the second main fuel injection.

In another aspect, a diesel engine is provided according to the present application and includes the combustion system described above.

The beneficial effects of the present application are as follows.

The method for controlling the combustion system, the combustion system and the diesel engine are provided according to the present application. The method for controlling the combustion system can superimpose spatial intensities of entrainment effects of high-speed oil beams of the two main fuel injections in the cylinder through the two main fuel injections, realizing two organizations of the oil beams to the flow field in the cylinder, strengthening the turbulence in the cylinder, improving the oil-gas mixing rate in the cylinder, and effectively improving the combustion speed and air utilization rate in the middle and late combustion stages. The cylinder pressure is ensured to reach the cylinder pressure upper threshold at least at partial moment during the first main fuel injection by determining the duration of the first main fuel injection and the first injection pressure. At least one of the duration of the second main fuel injection and the second injection pressure is iteratively adjusted, so that the change rate of the curve slopes of the cylinder pressure change curve is within the set range of slope change rates at any time point during the period when the cylinder pressure drops from the cylinder pressure upper threshold to the set cylinder pressure in the second main fuel injection, and the corresponding angle that the crankshaft has rotated is not less than the first preset rotation angle during the period when the cylinder pressure drops from the cylinder pressure upper threshold to the set cylinder pressure, which can ensure an optimal superposition effect of space entrainments and ensure an optimal power output of the diesel engine.

DETAILED DESCRIPTION OF EMBODIMENTS

Figure 1:
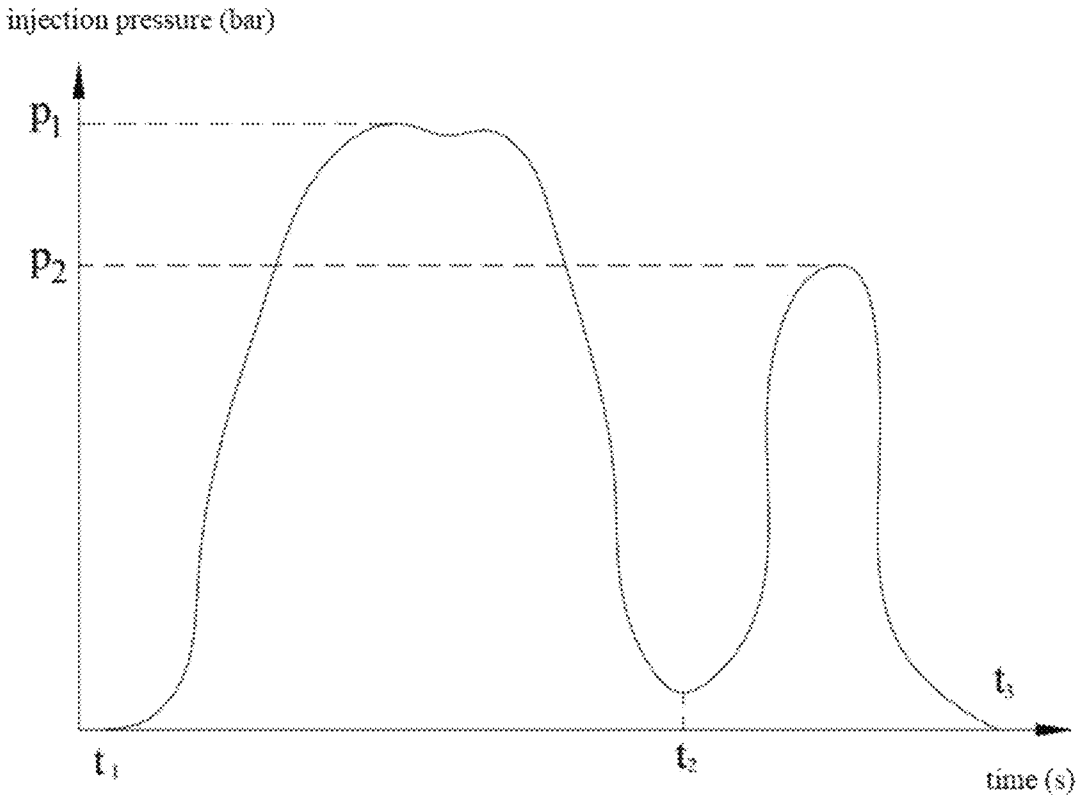
FIG. 1 is a schematic diagram of fuel injection law of an injector according to Embodiment 2 of the present application.

The technical solutions of the present application are clearly and completely described below in conjunction with the accompanying drawings. Apparently, the described embodiments are part of the embodiments of the present application, not all of them. All other embodiments obtained based on the embodiments in the present application without creative efforts by those skilled in the art fall are within the protection scope of the present application.

In the description of the present application, it should be noted that, orientations or positional relationships indicated by terms such as "center", "up", "down", "left", "right", "vertical", "horizontal", "inside" and "outside" are based on the orientations or position relationships shown in the accompanying drawings, and are only for the convenience of describing the present application and simplifying the description, rather than indicating or implying that devices or elements referred to must have specific orientations, or must be constructed and operated in specific orientations, and thus should not be understood as limitations to the present application. In addition, terms "first" and "second" are only used for description and should not be understood as indicating or implying relative importance. The terms "first position" and "second position" represent two different positions. Moreover, the first feature being "on", "above" and "over" the second feature includes that the first feature is directly above and obliquely above the second feature, or simply indicate that the first feature is horizontally higher than the second feature. The first feature being "below", "under" and "beneath" the second feature includes that the first feature is directly below and obliquely below the second feature, or simply indicate that the first feature is horizontally lower than the second feature.

In the description of the present application, it should be noted that, unless otherwise clearly specified and limited, terms "mount", "connect to" and "connect" should be understood in a broad sense, for example, may be a fixed connection, a detachable connection, or an integrated connections; may be a mechanical connection or an electric connection; may be a direct connection, or an indirect connection through an intermediary, and may be an internal connection of two elements. For those skilled in the art, the specific meanings of the terms in the present application can be understood based on specific situations.

The embodiments of the present application are described in detail below, examples of the embodiments are shown in the accompanying drawings, and same or similar reference signs represent same or similar elements or elements with same or similar functions throughout. The embodiments described below by referring to the accompanying drawings are exemplary, and are intended to explain the present application, and should not be understood as limitations to the present application.

Embodiment 1

The embodiment provides a combustion control system. The combustion control system includes a piston, an injector, and a cylinder. The piston can reciprocate up and down in the cylinder, and the injector is used to inject fuel into a combustion chamber with the piston. The combustion control system also includes a controller, the controller is configured to control the injector to execute at least a first main fuel injection and a second main fuel injection in sequence during each movement cycle of the piston, and the injector is configured to continuously inject fuel during a process from the first main fuel injection to the second main fuel injection. Velocities of the fuel injected by the injector during the first main fuel injection and the second main fuel injection are not lower than a set value. A velocity of the fuel injected by the injector between the first main fuel injection and the second main fuel injection is lower than the set value. The controller may be connected to a control valve arranged in a fuel supply pipeline that supplies fuel to the injector, so as to control the injection pressure of the injector by controlling the control current of the control valve, thereby the efficiency of the fuel injected by the injector is adjusted.

The controller is configured to determine duration of the first main fuel injection and a first injection pressure, so that the cylinder pressure can reach a cylinder pressure upper threshold at least at partial moment during the first main fuel injection. The controller is configured to iteratively adjust at least one of duration of the second main fuel injection and a second injection pressure, so that a change rate of curve slopes of a cylinder pressure change curve during a period when the cylinder pressure drops from the cylinder pressure upper threshold to a set cylinder pressure is within a set range of slope change rates at any time point, and an angle that a crankshaft has rotated during the period when the cylinder pressure drops from the cylinder pressure upper threshold to the set cylinder pressure is not less than a first preset rotation angle, in the second main fuel injection. The specific implementation process of the controller is detailed below.

In the embodiment, by controlling the injector to execute two main fuel injections during the movement cycle of the piston and continue auxiliary injection during the two main fuel injections, spatial intensities of the entrainment effects of high-speed oil beams of the two main fuel injections can be superimposed in the cylinder, realizing two organizations of the oil beams to the flow field in the cylinder, strengthening the turbulence in the cylinder, and improving the oil-gas mixing rate in the cylinder, and effectively improving the combustion speed and air utilization rate in the cylinder in the middle and late combustion stages. The cylinder pressure is ensured to at least reach the cylinder pressure upper threshold by determining the duration of the first main fuel injection and the first injection pressure. During the time period when the cylinder pressure drops from the cylinder pressure upper threshold to the set cylinder pressure in the second main fuel injection, the change rate of the curve slope of the cylinder pressure change curve is within the set range of slope change rates at any time point, and the angle that the crankshaft has rotated is not less than the first preset rotation angle, which can ensure the optimal superposition effect of space entrainments and ensure the optimal power output of the diesel engine.

Embodiment 2

A diesel engine is provided according to the embodiment, and the diesel engine includes the combustion system according to Embodiment 1. The diesel engine has the beneficial effects of the combustion system according to Embodiment 1.

Embodiment 3

A method for controlling a combustion system is provided according to the embodiment, and the method can be implemented through the combustion system according to Embodiment 1. The method for controlling a combustion system includes the following steps S100 to S200.

S100: determining the duration of the first main fuel injection and the first injection pressure to allow the cylinder pressure to reach the cylinder pressure upper threshold at least at partial moment during the first main fuel injection.

S200: iteratively adjusting at least one of the duration of the second main fuel injection and the second injection pressure, to allow the change rate of the curve slopes of the cylinder pressure change curve to be within the set range of slope change rates at each time point during the period when the cylinder pressure drops from the cylinder pressure upper threshold to the set cylinder pressure, and to allow the angle that the crankshaft has rotated during the period when the cylinder pressure drops from the cylinder pressure upper threshold to the set cylinder pressure to be not less than the first preset rotation angle, in the second main fuel injection.

The method for controlling a combustion system can superimpose the spatial intensities of the entrainment effects of the high-speed oil beams of the two main fuel injections in the cylinder by controlling the injector to execute the two main fuel injections during the movement cycle of the piston and continue the auxiliary injection during the two main fuel injections, realizing two organizations of the oil beams to the flow field in the cylinder, strengthening the turbulence in the cylinder, and improving the oil-gas mixing rate in the cylinder, and effectively improving the combustion speed and air utilization rate in the cylinder in the middle and late combustion stages. At the same time, the method can also ensure the optimal superposition effect of space entrainments and ensure the optimal power output of the diesel engine.

Optionally, in step S100, if the cylinder pressure never reaches the cylinder pressure upper threshold during the first main fuel injection, iteratively adjust at least one of a start time and an end time of the first main fuel injection, and current first injection pressure until the cylinder pressure reaches the cylinder pressure upper threshold at least at least at partial moment during the first main fuel injection, a crankshaft angle when the cylinder pressure reaches the cylinder pressure upper threshold for a first time does not exceed a first angle, and an angle that the crankshaft has rotated during a period when the cylinder pressure rises from the first cylinder pressure to the cylinder pressure upper threshold is not less than a second preset rotation angle. A cylinder volume when the cylinder pressure is equal to the first cylinder pressure is the same as a cylinder volume when the cylinder pressure reaches the cylinder pressure upper threshold for a first time. In this way, a closed-loop adjustment of the cylinder pressure during the first main fuel injection can be realized, and ultimately make the cylinder pressure can reach the cylinder pressure upper threshold during the first main fuel injection.

As shown in FIG. 1, during each movement cycle of the piston, the timing when the injector starts the first main fuel injection is a first time $t_1$, the timing when a velocity of the fuel injected by the injector is lowest between the first main fuel injection and the second main fuel injection is a second time $t_2$. A corresponding injection pressure when the velocity of the fuel injected by the injector is highest during the first main fuel injection executed by the injector is a first injection pressure $P_1$.

Specifically, the step "if the cylinder pressure never reaches the cylinder pressure upper threshold during the first main fuel injection, iteratively adjust at least one of a start time and an end time of the first main fuel injection, and current first injection pressure until the cylinder pressure reaches the cylinder pressure upper threshold at least at least at partial moment during the first main fuel injection, a corresponding crankshaft angle does not exceed a first angle when the cylinder pressure reaches the cylinder pressure upper threshold for a first time, and an angle that the crankshaft has rotated during a period when the cylinder pressure rises from the first cylinder pressure to the cylinder pressure upper threshold is not less than a second preset rotation angle" is implemented through the following steps S10 to S30.

In step S10, during the first main fuel injection, the cylinder pressure P in the cylinder is collected in real time, and the crankshaft angle is collected in real time.

In step S20, the cylinder pressure P is compared with the cylinder pressure upper threshold $P_{max}$, and whether the crankshaft angle exceeds the first angle is determined.

If the cylinder pressure P is less than the cylinder pressure upper threshold $P_{max}$, and the crankshaft angle is behind the first angle, step S30 is executed.

In step S30, the first injection pressure $P_1$ is increased, and/or a difference between the second time $t_2$ and the first time $t_1$ is wholly reduced, and S10 is repeated.

Figure 2:
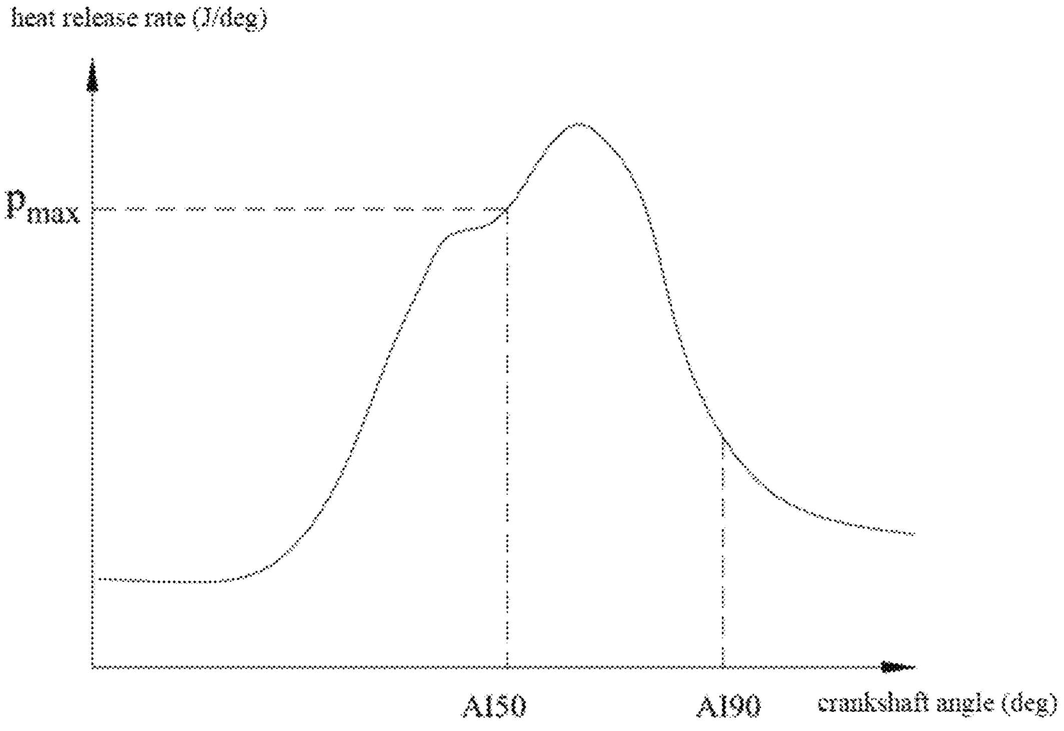
FIG. 2 is a schematic diagram of a relationship between instantaneous heat release rates and crankshaft angles according to Embodiment 2 of the present application.

Through steps S10 to S30, the cylinder pressure can be ensured to be not less than the cylinder pressure upper threshold $P_{max}$ when the crankshaft angle has not reached the first angle after a limited number of movement cycles of the piston, thus the combustion speed and the air utilization rate in the cylinder in the middle and late combustion stages are improved. As shown in FIG. 2, in the embodiment, the first angle is AI50, so the method for controlling a combustion system can effectively shorten the time from AI50 to AI90 and control the combustion rate to be at $P_{max}$ stably during the period between AI50 and AI90. The specific value of $P_{max}$ may be set according to actual needs.

Optionally, the method for increasing the first injection pressure $P_1$ and/or wholly reducing the difference between the second time $t_2$ and the first time $t_1$ is as follows:

acquiring a maximum value $P_x$ of the cylinder pressure during the first main fuel injection;

calculating $n=(P_{max}-P_x)/P_{max}$; and only increasing the first injection pressure $P_1$ by a first set value if $n \leq 5\%$.

It can be understood that the maximum value of the cylinder pressure $P_x$ during the first main fuel injection may be acquired from all values of the cylinder pressure collected during the movement cycle of the piston, and $P_{max}>P_x$. The increasing the first injection pressure $P_1$ by the first set value is taken as an example and means that the first set value is added to the first injection pressure $P_1$ in the current movement cycle of reciprocating up and down of the piston, and the calculated value is used as a new first injection pressure $P_1$, which is applied to the next movement cycle of the piston.

If $n>5\%$, the first injection pressure $P_1$ is increased by the first set value, and simultaneously the first time $t_1$ and/or the second time $t_2$ is adjusted to wholly reduce the difference between the second time $t_2$ and the first time $t_1$ by the second set value.

Since the first injection pressure $P_1$ cannot be increased indefinitely, the difference between $P_{max}$ and the maximum value $P_x$ of the cylinder pressure during the first main fuel injection is small when $n \leq 5\%$. The injection rate of the oil beam may be directly improved by adjusting the first injection pressure $P_1$, thereby the degree of oil-gas mixing and the flow field in the cylinder is improved, and the cylinder pressure P in the cylinder and the crankshaft angle when the cylinder pressure P reaches $P_{max}$ is adjusted. The difference between $P_{max}$ and the maximum value $P_x$ of the cylinder pressure during the first main fuel injection is relatively large when $n>5\%$. It is required to adjust the difference between the second time $t_2$ and the first time $t_1$ while adjusting the first injection pressure $P_1$, which can also improve the injection rate of the oil beam and adjust the cylinder pressure P in the cylinder and the crankshaft angle when the cylinder pressure P reaches $P_{max}$. The first set value and the second set value may be set as required, and only the second time $t_2$ or the first time $t_1$ may be adjusted separately as required when adjusting the difference between the second time $t_2$ and the first time $t_1$.

In the embodiment, a solution of adjusting the duration of the first main fuel injection and the first injection pressure based on experience is exemplarily provided. In other embodiments, the duration of the first main fuel injection and the first injection pressure may also be adjusted by a model.

Optionally, in step S20, if the cylinder pressure P is greater than or equal to the cylinder pressure upper threshold $P_{max}$, and the crankshaft angle is before the first angle, the method for controlling a combustion system further includes the following steps S40 to S80 after step S20.

In step S40, a real-time cylinder volume V in the cylinder is acquired when the cylinder pressure P is equal to the cylinder pressure upper threshold $P_{max}$.

Specifically, that acquiring the real-time cylinder volume in the cylinder is the conventional technology, for example, a cylinder pressure curve of each cycle of the diesel engine may be collected through a combustion analyzer, and thus the real-time cylinder volume in the cylinder is acquired. The real-time cylinder volume V is the cylinder volume V when the cylinder pressure reaches $P_{max}$ for the first time during the first main fuel injection.

In step S50, a crankshaft angle $\phi_a$ when the cylinder goes up and a crankshaft angle $\phi_b$ when the cylinder goes down when the cylinder volume is equal to the real-time cylinder volume V are acquired according to a relationship map between the cylinder volume and the crankshaft angle.

Figure 3:
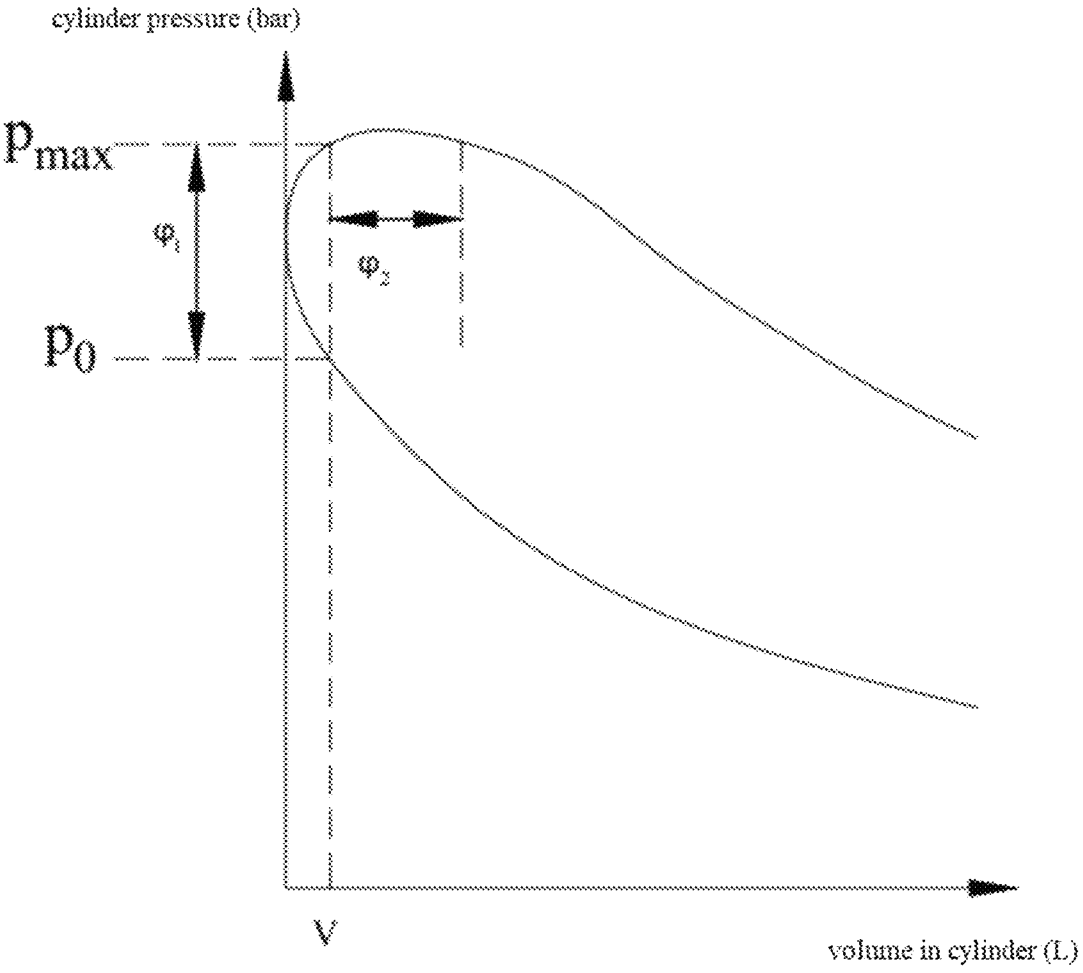
FIG. 3 is an indicator diagram of combustion rates and cylinder pressures of entrainment effect according to Embodiment 2 of the present application.

It can be understood that, as the piston goes up and down, the volume in the cylinder first decreases and then increases. Therefore, corresponding to a same real-time volume, there are a position of the crankshaft angle when the piston goes up and a position of the crankshaft angle when the piston goes down. As shown in FIG. 3, in the embodiment, the first cylinder pressure P corresponding to the crankshaft angle $\phi_a$ when the cylinder goes up is $P_0$, and the cylinder pressure P is equal to the cylinder pressure upper threshold $P_{max}$ when the crankshaft angle is $\phi_b$ when the cylinder goes down. The relationship map between the cylinder volume and the crankshaft angle may be acquired through a large number of previous experiments and is pre-stored in the controller.

In step S60, $\phi_1=\phi_b-\phi_a$ is calculated.

In step S70, $\phi_1$ and the second preset rotation angle $\phi_n$ are compared.

If $\phi_1<\phi_n$, step S80 is executed.

In step S80, the first injection pressure $P_1$ is increased by a third set value, and/or the first time $t_1$ and/or the second time $t_2$ is adjusted to wholly reduce the difference between the second time $t_2$ and the first time $t_1$ by a fourth set value, and step S10 is repeated.

A closed-loop adjustment of the angle that the crankshaft has rotated during the period when the cylinder pressure rises from the first cylinder pressure to the cylinder pressure upper threshold can be realized through steps S40 to S80, ensuring that $\phi_1$ is not less than $\phi_n$ after a limited number of movement cycles of the piston, and further ensuring the optimal economic efficiency of the entrainment superposition effects of the double main injections. Specifically, $\phi_n$, the third set value and the fourth set value may be set as required.

Optionally, the second injection pressure is $P_2$. In a case that $\phi_1 \geq \phi_n$), the step "iteratively adjusting at least one of the duration of the second main fuel injection and the second injection pressure, to allow the change rate of the curve slopes of the cylinder pressure change curve to be within the set range of slope change rates at each time point during the period when the cylinder pressure drops from the cylinder pressure upper threshold to the set cylinder pressure in the second main fuel injection, and to allow the angle that the crankshaft has rotated during the period when the cylinder pressure drops from the cylinder pressure upper threshold to the set cylinder pressure to be not less than the first preset rotation angle" in step S200 includes the following steps S90 to S140 after step S80.

In step S90, a crankshaft angle $\phi_c$ when the cylinder pressure P is equal to $P_n$ is acquired according to the map, $\phi_c>\phi_b$, $P_n$ is the set cylinder pressure and $P_{max}>P_n$.

It is understandable that, since $\phi_c>\phi_b$, the cylinder pressure P corresponding to the crankshaft angle between $\phi_b$ and $\phi_c$ is at least not less than $P_n$, the cylinder pressure can be considered to be within the peak fluctuation. $P_n$ may be set as required.

In step S100, a relationship curve y between the cylinder pressure and the crankshaft angle in a range from the crankshaft angle $\phi_b$ to the crankshaft angle $\phi_c$ is acquired. Specifically, in the relationship curve y between the cylinder pressure and the crankshaft angle, an independent variable is the crankshaft angle, and a dependent variable is the cylinder pressure.

In step S110, $k_1=dy/d\,\phi$ and $k_2=dk_1/d\,\phi$ are calculated, and a range of $\phi$1s from $\phi_b$ to $\phi_c$.

In the formulas, $k_1$ is a slope of the curve y, and $k_2$ is a change rate of the slope of the curve.

In step S120, a maximum value $k_{max}$ of an absolute value of $k_2$ is acquired.

The maximum value of the absolute value of $k_2$ refers to a value of a largest absolute value of a smallest negative value of $k_2$ and a largest positive value of $k_2$ in the range of $\phi$ from $\phi_b$ to $\phi_c$.

In step S130, $k_{max}$ is compared with and a preset parameter $k_a$.

If $k_{max}<k_a$, step S140 is executed.

In step S140, the second injection pressure $P_2$ is increased by a fifth set value, and step S10 is repeated.

The specific value of $k_a$ and the fifth set value may be set as required. In the embodiment, the value of $k_a$ is 0.05, and the corresponding set range of slope change rates is −0.05 to 0.05. When the minimum value of $k_2$ is not less than $k_a$, the value of $k_a$ is greater than or equal to 0.05. It can be understood that the injection rail pressure can be increased to maintain the cylinder pressure around a constant value by increasing the second injection pressure $P_2$. A closed-loop adjustment of the change rate of curve slopes of the cylinder pressure change curve at any time point during the period when the cylinder pressure drops from the cylinder pressure upper threshold to the set cylinder pressure is realized through steps S90 to S140, which can ensure that the minimum value of $k_2$ is not less than $k_a$ after a limited number of movement cycles of the piston, and thus can ensure the optimal economic efficiency of the entrainment superposition effects of the double main injections.

Optionally, the timing when the injector ends the second main fuel injection is a third time $t_3$. If $k_{max}\geq k_a$, the method for controlling a combustion system further includes the following steps S150 to S180 after step S130.

In step S150, $\phi_2=\phi_c-\phi_b$ is calculated.

In step S160, $\phi$ 2 and the first preset rotation angle $\phi_m$ are compared.

Step S170 is executed in a case that $\phi_2<\phi_m$, and step S180 is executed in a case that $\phi_2\geq\phi_m$.

In step S170, the third time $t_3$ is increased by a sixth set value.

In step S180, the third time $t_3$ is maintained constant.

The sixth set value and the second preset rotation angle $\phi_m$ may be set as required. A closed-loop adjustment of the corresponding angle that the crankshaft has rotated during the period when the cylinder pressure drops from the cylinder pressure upper threshold to the set cylinder pressure is realized through steps S150 to S180, which can ensure that $\phi 2$ is not less than $\phi_m$ after a limited number of reciprocating movements of the piston, and further can ensure that the sum of $\phi_1$ and $\phi_2$ is large enough to optimize the economic efficiency of the entrainment superposition effects of the double main injections.

Apparently, the embodiments of the present application are only examples for clearly illustrating the present application and are not intended to limit the implementations of the present application. For those skilled in the art, other variations or changes can be made based on the above description. It is not necessary and impossible to exhaustively list all implementations herein. Any modifications, equivalent replacements and improvements made within the spirit and the principles of the present application shall be included within the protection scope of the present application.

The invention claimed is:

1. A method for controlling a combustion system, wherein the combustion system comprises a piston, an injector, and a cylinder, the piston is configured to reciprocate up and down in the cylinder, the injector is configured to execute at least a first main fuel injection and a second main fuel injection in sequence during each movement cycle of the piston, and the injector is configured to continuously inject fuel during a process from the first main fuel injection to the second main fuel injection; an injection pressure when a velocity of the fuel injected by the injector is highest during the first main fuel injection executed by the injector is a first injection pressure, and an injection pressure when a velocity of the fuel injected by the injector is highest during the second main fuel injection executed by the injector is a second injection pressure;

the method for controlling a combustion system comprising:

determining a duration of the first main fuel injection and the first injection pressure to allow a cylinder pressure to reach a cylinder pressure upper threshold at least at partial moment during the first main fuel injection; and iteratively adjusting at least one of a duration of the second main fuel injection and the second injection pressure, to allow a change rate of curve slopes of a cylinder pressure change curve during a period when the cylinder pressure drops from the cylinder pressure upper threshold to a set cylinder pressure to be within a set range of slope change rates at any time point, and to allow an angle that a crankshaft has rotated during the period when the cylinder pressure drops from the cylinder pressure upper threshold to the set cylinder pressure to be not less than a first preset rotation angle in the second main fuel injection.

2. The method for controlling a combustion system according to claim 1, wherein that determining the duration of the first main fuel injection and the first injection pressure to allow the cylinder pressure to reach the cylinder pressure upper threshold at least at partial moment during the first main fuel injection comprises:

iteratively adjusting at least one of a start time and an end time of the first main fuel injection, and current first injection pressure until the cylinder pressure reaches the cylinder pressure upper threshold at least at partial moment during the first main fuel injection, a crankshaft angle when the cylinder pressure reaches the cylinder pressure upper threshold for a first time does not exceed a first angle, and an angle that the crankshaft has rotated during a period when the cylinder pressure rises from the first cylinder pressure to the cylinder pressure upper threshold is not less than a second preset rotation angle, in a case that the cylinder pressure never reaches the cylinder pressure upper threshold during the first main fuel injection; wherein a cylinder volume when the cylinder pressure is equal to the first cylinder pressure is the same as a cylinder volume when the cylinder pressure reaches the cylinder pressure upper threshold for the first time.

3. The method for controlling a combustion system according to claim 2, wherein during each movement cycle of the piston, a timing when the injector starts the first main fuel injection is a first time $t_1$, a timing when a velocity of the fuel injected by the injector is lowest between the first main fuel injection and the second main fuel injection is a second time $t_2$, and the first injection pressure is $P_1$;

that iteratively adjusting at least one of the start time and the end time of the first main fuel injection, and the current first injection pressure until the cylinder pressure reaches the cylinder pressure upper threshold at least at partial moment during the first main fuel injection, the crankshaft angle when the cylinder pressure reaches the cylinder pressure upper threshold for the first time does not exceed the first angle, and the angle that the crankshaft has rotated during the period when the cylinder pressure rises from the first cylinder pressure to the cylinder pressure upper threshold is not less than the second preset rotation angle, in the case that the cylinder pressure never reaches the cylinder pressure upper threshold during the first main fuel injection, comprises:

collecting the cylinder pressure P in the cylinder in real time, collecting the crankshaft angle in real time, comparing the cylinder pressure P with the cylinder pressure upper threshold $P_{max}$, and determining whether the crankshaft angle exceeds the first angle, during the first main fuel injection; and increasing the first injection pressure $P_1$, and/or, wholly reducing a difference between the second time $t_2$ and the first time $t_1$, if the cylinder pressure P is less than the cylinder pressure upper threshold $P_{max}$, and the crankshaft angle is behind the first angle.

4. The method for controlling a combustion system according to claim 3, wherein the increasing the first injection pressure $P_1$, and/or, wholly reducing the difference between the second time $t_2$ and the first time $t_1$ comprises:

acquiring a maximum value $P_x$ of the cylinder pressure during the first main fuel injection;

calculating $n=(P_{max}-P_x)/P_{max}$; and only increasing the first injection pressure $P_1$ by a first set value if $n \leq 5\%$.

5. The method for controlling a combustion system according to claim 4, wherein if $n>5\%$, increasing the first injection pressure $P_1$ by the first set value, and adjusting the first time $t_1$ and/or the second time $t_2$ to wholly reduce the difference between the second time $t_2$ and the first time $t_1$ by a second set value.

6. The method for controlling a combustion system according to claim 3, wherein if the cylinder pressure P is not less than the cylinder pressure upper threshold $P_{max}$, and the crankshaft angle is before the first angle, acquiring a real-time cylinder volume V in the cylinder when the cylinder pressure P is equal to the cylinder pressure upper threshold $P_{max}$;

acquiring a crankshaft angle $\phi_a$ when the cylinder goes up and a crankshaft angle $\phi_b$ when the cylinder goes down when the cylinder volume is equal to the real-time cylinder volume V, according to a relationship map between the cylinder volume and the crankshaft angle;

calculating $\phi_1=\phi_b-\phi_a$;

comparing $\phi_1$ with the second preset rotation angle $\phi_n$; and increasing the first injection pressure $P_1$ by a third set value, and/or adjusting the first time $t_1$ and/or the second time $t_2$ to wholly reduce the difference between the second time $t_2$ and the first time $t_1$ by a fourth set value, in a case that $\phi_1<\phi_n$.

7. The method for controlling a combustion system according to claim 6, wherein the second injection pressure is $P_2$; that iteratively adjusting at least one of a duration of the second main fuel injection and the second injection pressure, to allow the change rate of the curve slopes of the cylinder pressure change curve during the period when the cylinder pressure drops from the cylinder pressure upper threshold to the set cylinder pressure to be within the set range of slope change rates at any time point, and to allow the angle that the crankshaft has rotated during the period when the cylinder pressure drops from the cylinder pressure upper threshold to the set cylinder pressure to be not less than the first preset rotation angle in the second main fuel injection comprises:

in a case that $\phi_1 \geq \phi_n$;

acquiring a crankshaft angle $\phi_e$ when the cylinder pressure P is equal to $P_n$ according to the map, wherein $\phi_c>\phi_b$, $P_1$ is the set cylinder pressure and $P_{max}>P_n$;

acquiring a relationship curve y between the cylinder pressure and the crankshaft angle in a range from the crankshaft angle $\phi_b$ to the crankshaft angle $\phi_e$;

calculating $k_1=dy/d\phi$, and $k_2=dk_1/d\phi$, wherein a range of $\phi$1s from $\phi_b$ to $\phi_c$;

acquiring a maximum value $k_{max}$ of absolute values of $k_2$;

comparing $k_{max}$ with a preset parameter $k_a$;

increasing the second injection pressure $P_2$ by a fifth set value if $k_{max}<k_a$.

8. The method for controlling a combustion system according to claim 7, wherein a timing when the injector ends the second main fuel injection is a third time $t_3$, if $k_{max} \geq k_a$, the method for controlling a combustion system further comprising:

calculating $\phi_2=\phi_c-\phi_b$;

comparing $\phi_2$ with the first preset rotation angle $\phi_m$; and increasing the third time $t_3$ by a sixth set value in a case that $\phi_2<\phi_m$.

9. The method for controlling a combustion system according to claim 8, wherein maintaining the third time $t_3$ constant in a case that $\phi_2 \geq \phi_m$.

10. A combustion system, for implementing the method for controlling a combustion system according to claim 1, comprising a piston, an injector, a cylinder, and a controller, wherein the controller is configured to control the injector to execute at least the first main fuel injection and the second main fuel injection in sequence during each movement cycle of the piston, and the injector is configured to continuously inject fuel during the process from the first main fuel injection to the second main fuel injection;

the controller is configured to determine the duration of the first main fuel injection and the first injection pressure to allow the cylinder pressure to reach the cylinder pressure upper threshold at least at partial moment during the first main fuel injection; and the controller is configured to iteratively adjust at least one of the duration of the second main fuel injection and the second injection pressure, to allow the change rate of the curve slopes of the cylinder pressure change curve during the period when the cylinder pressure drops from the cylinder pressure upper threshold to the set cylinder pressure to be within the set range of slope change rates at any time point, and to allow the corresponding angle that the crankshaft has rotated during the period when the cylinder pressure drops from the cylinder pressure upper threshold to the set cylinder pressure to be not less than the first preset rotation angle, in the second main fuel injection.

11. A diesel engine, comprising the combustion system according to claim 10.

* * * * *